| United States Patent [19] | [11] | 4,431,525 |
|---|---|---|
| Hensley, Jr. et al. | [45] | Feb. 14, 1984 |

[54] THREE-CATALYST PROCESS FOR THE HYDROTREATING OF HEAVY HYDROCARBON STREAMS

[75] Inventors: Albert L. Hensley, Jr., Munster, Ind.; Leonard M. Quick, Naperville, Ill.

[73] Assignee: Standard Oil Company (Indiana), Chicago, Ill.

[21] Appl. No.: 371,815

[22] Filed: Apr. 26, 1982

[51] Int. Cl.$^3$ ............... C10G 45/08; C10G 65/04
[52] U.S. Cl. .................. 208/210; 208/216 PP; 208/251 H; 208/254 H
[58] Field of Search ......... 208/216 PP, 210, 251 H, 208/254 H, 89

[56] References Cited

U.S. PATENT DOCUMENTS

| 4,054,508 | 10/1977 | Milstein et al. | 208/89 |
| 4,173,528 | 11/1979 | Frayer et al. | 208/210 |
| 4,212,729 | 7/1980 | Hensley, Jr. et al. | 208/210 |
| 4,225,421 | 9/1980 | Hensley, Jr. et al. | 208/216 PP |
| 4,306,965 | 12/1981 | Hensley, Jr. et al. | 208/216 PP |

*Primary Examiner*—Delbert E. Gantz
*Assistant Examiner*—O. Chaudhuri
*Attorney, Agent, or Firm*—James L. Wilson; William T. McClain; William H. Magidson

[57] ABSTRACT

There is disclosed a process for hydrotreating a heavy hydrocarbon stream containing metals, asphaltenes, nitrogen compounds, and sulfur compounds to reduce the contents of these contaminants. The process comprises contacting said stream in the presence of hydrogen and under suitable hydrotreating conditions in sequence with a first catalyst in a first reaction zone, a second catalyst in a second reaction zone, and a third catalyst in a third reaction zone. The first catalyst comprises a Group VIB metal and/or a Group VIII metal on a porous inorganic oxide support; the second catalyst consists essentially of at least one hydrogenation metal selected from Group VIB deposed on a support material comprising alumina; and the third catalyst comprises a hydrogenating component comprising molybdenum, chromium, and cobalt on a large-pore, catalytically-active alumina. Each catalyst has specific physical properties.

24 Claims, 2 Drawing Figures

THREE-CATALYST PROCESS FOR THE HYDROTREATING OF HEAVY HYDROCARBON STREAMS

BACKGROUND OF THE INVENTION

This invention is related to the catalytic treatment in the presence of hydrogen of heavy hydrocarbon streams containing asphaltenic material, metals, nitrogen compounds, and sulfur compounds. More particularly, this invention relates to the hydroprocessing of hydrocarbon streams containing the aforesaid impurities in the presence of a multiple-catalyst system.

As the amount of heavier crude oil of poorer quality is required to be processed by refiners, processes that treat those hydrocarbon fractions containing increasingly higher levels of metals, asphaltenes, nitrogen, and sulfur will be employed.

It is widely known that various organometallic compounds and asphaltenes are present in petroleum crude oils and other heavy petroleum hydrocarbon streams, such as petroleum hydrocarbon residua, hydrocarbon streams derived from tar sands, and hydrocarbon streams derived from coal. The most common metals found in such hydrocarbon streams are nickel, vanadium, and iron. Such metals are very harmful to various petroleum refining operations, such as hydrocracking, hydrodesulfurization, and catalytic cracking. The metals and asphaltenes cause interstitial plugging of the catalyst bed and reduced catalyst life. The various metal deposits on a catalyst tend to poison or deactivate the catalyst. Furthermore, the asphaltenes tend to reduce the susceptibility of the hydrocarbons to desulfurization. If a catalyst, such as a desulfurization catalyst or a fluid cracking catalyst, is exposed to a hydrocarbon fraction that contains metals and asphaltenes, the catalyst will become deactivated rapidly and will be subject to premature removal from the particular reactor and replacement by a new catalyst.

Although processes for the hydrotreating of heavy hydrocarbon streams, including but not limited to heavy crudes, reduced crudes, and petroleum hydrocarbon residua, are known, the use of fixed-bed catalytic processes to convert such feedstocks without appreciable asphaltene precipitation and reactor plugging and with effective removal of metals and other contaminants, such as sulfur compounds and nitrogen compounds, is not too common. The catalysts of such processes generally have not been capable of maintaining satisfactory activity and performance. While the heavy portions of hydrocarbon streams once could be used as a low-quality fuel or as a source of asphaltic-type materials, the politics and economics of today require that such material be hydrotreated to remove environmental hazards therefrom and to obtain a greater proportion of usable products from such feeds.

Multiple-stage catalytic processes wherein a hydrocarbon stream having a high metals content is first subjected to a hydrodemetallization step followed by a hydrodesulfurization treatment are known. However, catalyst deactivation occurs quite rapidly and therefore prohibits such processes from providing suitable commercial application. Such multiple-stage catalytic processes are disclosed in U.S. Pat. Nos. 3,730,879 (Christman, et al.); 3,977,961 (Hamner); 3,985,684 (Arey, et al.); 4,016,067 (Fischer, et al.); and 3,928,176 (Hamner, et al.). The catalysts that are disclosed in the aforesaid patents contain a hydrogenating component that comprises one or more metals from Group VIB and/or Group VIII of the Periodic Table of Elements on a high-surface area support, such as alumina. Combinations of metals such as cobalt and molybdenum, nickel and molybdenum, nickel and tungsten, and cobalt, nickel, and molybdenum have been considered. In general, the preferred metals in such hydrotreatment processes are a combination of cobalt and molybdenum. Such is the case for the first-stage catalyst which is employed to remove a major portion of the contaminating metals and the second-stage catalyst, which is employed primarily to remove sulfur.

In U.S. Pat. No. 4,119,531, Hopkins, et al., disclose a catalyst for the hydrodemetallization of petroleum hydrocarbon streams containing asphaltenes and large quantities of metals, which catalyst consists essentially of a small amount of a single hydrogenation metal selected from Group VIB of the Periodic Table of Elements and metals from Group VIII of the Periodic Table of Elements deposed on a large-pore alumina. Suitably, nickel or molybdenum is employed as the hydrogenating metal. The catalyst is characterized by a surface area of at least 120 m$^2$/gm; a pore volume of at least 0.7 cc/gm, and an average pore diameter of at least 12.5 nm (125 Angstrom units [Å]).

In U.S. Pat. No. 4,181,602 and U.S. Pat. No. 4,188,284, Quick, et al., disclose processes for hydrotreating a heavy hydrocarbon stream containing metals, asphaltenes, nitrogen compounds, and sulfur compounds, wherein the stream is contacted with a catalyst comprising a hydrogenating component comprising chromium and molybdenum on a large-pore, catalytically active alumina. In U.S. Pat. No. 4,181,602, the hydrogenation component also comprises a small amount of cobalt. The catalysts possess a pore volume within the range of about 0.4 cc/gm to about 0.8 cc/gm, a surface area within the range of about 150 m$^2$/gm to about 300 m$^2$/gm, and an average pore diameter within the range of about 10 nm (100 Å) to about 20 nm (200 Å). The pore-size distribution of each of these catalysts is as follows: about 0% to about 10% of the pore volume is in pores having diameters that are smaller than 5 nm (50 Å), about 30% to about 80% of the pore volume is in pores having diameters within the range of about 5 nm (50 Å) to about 10 nm (100 Å), about 10% to about 50% of the pore volume is in pores having diameters within the range of about 10 nm (100 Å) to about 15 nm (150 Å), and about 0% to about 10% of the pore volume is in pores having diameters that are larger than 15 nm (150 Å).

In U.S. Pat. No. 4,212,729, Hensley, et al., disclose a two-stage catalytic process for the hydrodemetallization and hydrodesulfurization of a hydrocarbon feedstock containing asphaltenes and a substantial amount of metals, wherein said feedstock is contacted in a first catalyst zone with a catalyst comprising a hydrogenation metal component selected from the group consisting of a Group VIB metal, a Group VIII metal, and a mixture thereof and a porous inorganic oxide support, said catalyst having a surface area of about 120 m$^2$/gm to about 400 m$^2$/gm, a pore volume of about 0.7 cc/gm to about 1.5 cc/gm, and an average pore diameter within the range of about 12.5 nm (125 Å) to about 35 nm (350 Å). The effluent from this first catalyst zone is contacted subsequently with a catalyst consisting essentially of at least one active original hydrogenation metal selected from Group VIB deposed on a catalytically-active support comprising alumina, said catalyst having a surface area within the range of about 150 m²/gm to about 300 m²/gm and having a majority of its pore volume in pore diameters within the range of about 8 nm (80 Å) to about 13 nm (130 Å), and a pore volume within the range of about 0.4 cc/gm to about 0.9 cc/gm.

The disclosures of each of the last three patents are incorporated herein by reference.

Not one of the above-discussed references discloses a three-catalyst hydrotreating process wherein the last catalyst contains both chromium and molybdenum and the second catalyst contains only a Group VIB metal on a relatively small pore support material. There has now been found a process for the hydrotreating of heavy hydrocarbon streams containing asphaltenes and a substantial amount of metals, which process comprises contacting the stream in sequence with three catalysts. This process provides an improvement over the prior art processes by providing a lined-out deactivation rate that is very low.

SUMMARY OF THE INVENTION

There is provided a process for the hydrotreating of a heavy hydrocarbon stream containing metals, asphaltenes, nitrogen compounds, and sulfur compounds, which process comprises contacting said stream in a first reaction zone in the presence of hydrogen and under suitable hydrotreating conditions with a first catalyst comprising a hydrogenating component selected from the group consisting of a Group VIB metal, a Group VIII metal, and a mixture thereof deposited on a porous inorganic oxide support, said hydrogenating component being present in the elemental form, as the oxide, as the sulfide, or mixtures thereof, and said catalyst having a surface area of about 120 m²/gm to about 400 m²/gm, a pore volume within the range of about 0.7 cc/gm to about 1.5 cc/gm, and an average pore diameter within the range of about 12.5 nm (125 Å) to about 35 nm (350 Å) to obtain a first effluent; contacting said first effluent in a second reaction zone in the presence of hydrogen and under suitable hydrotreating conditions with a second catalyst consisting essentially of at least one active original hydrogenation metal selected from Group VIB deposited on a catalytically-active support material comprising alumina, said Group VIB metal being present in the elemental form, as the oxide, as the sulfide, or mixtures thereof, said second catalyst having a surface area within the range of about 150 m²/gm to about 300 m²/gm, having a majority of its pore volume in pore diameters within the range of about 8 nm (80 Å) to about 13 nm (130 Å), and a pore volume within the range of about 0.4 cc/gm to about 0.9 cc/gm to provide a second effluent; and contacting said second effluent in a third reaction zone in the presence of hydrogen and under suitable hydrotreating conditions with a third catalyst comprising a hydrogenating component selected from the group consisting of (1) molybdenum, chromium, and cobalt, (2) their oxides, (3) their sulfides, and (4) mixtures thereof on a large-pore, catalytically-active alumina, said third catalyst possessing a pore volume within the range of about 0.4 cc/gm to about 0.8 cc/gm, a surface area within the range of about 150 m²/gm to about 300 m²/gm, and an average pore diameter within the range of about 10 nm (100 Å) to about 20 nm (200 Å).

BRIEF DESCRIPTION OF THE DRAWINGS

The accompanying

The accompanying

DETAILED DESCRIPTION OF THE INVENTION

Figure 1:
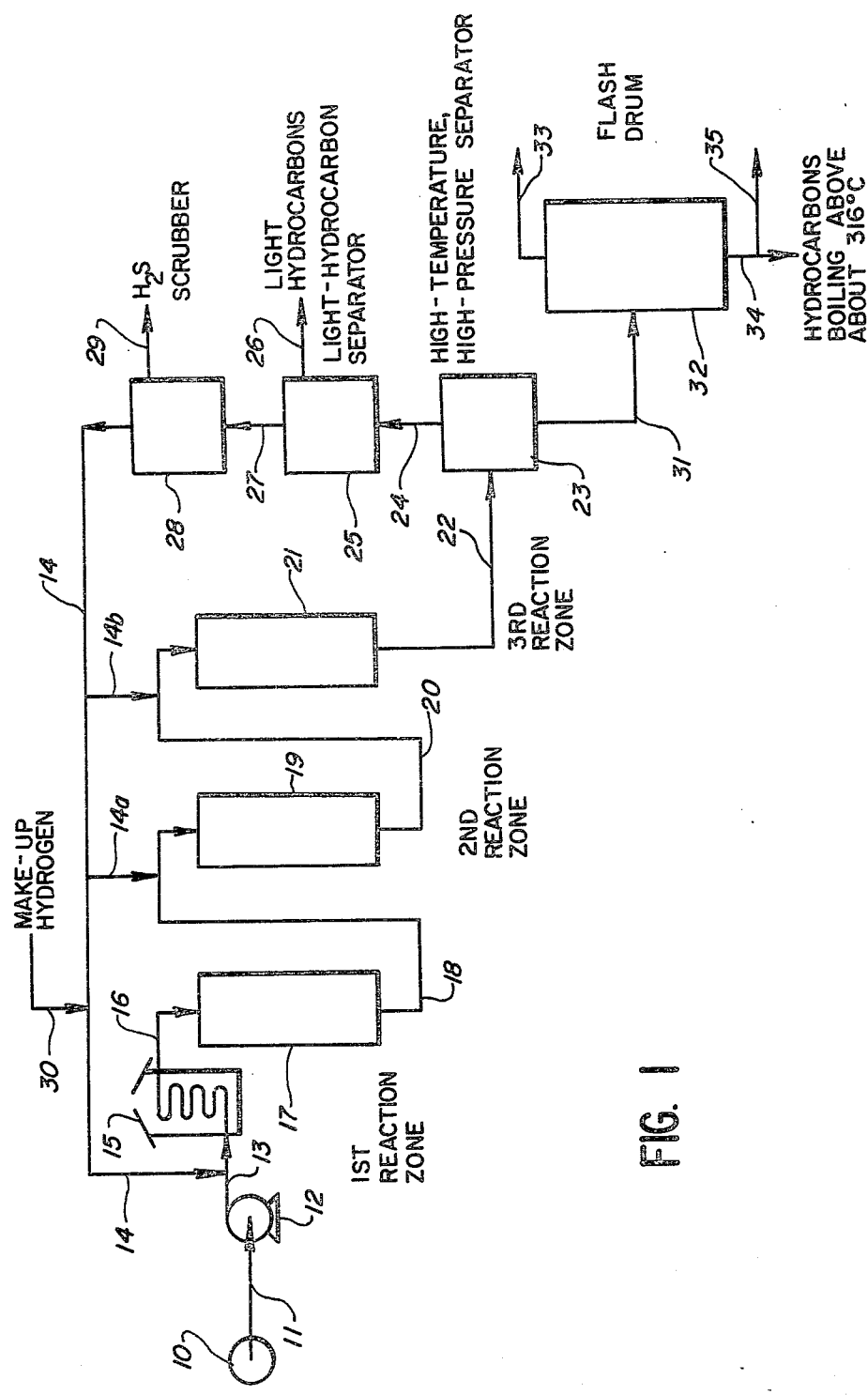
FIG. 1 presents a simplified flow diagram of a preferred embodiment of the process of the present invention.

The present invention is directed to a novel process for the hydrotreating of heavy hydrocarbon feedstocks. Such feedstocks will contain asphaltenes, metals, nitrogen compounds, and sulfur compounds. It is to be understood that the feedstocks that are to be treated by the process of the present invention will contain from a small amount of nickel and vanadium, e.g., less than 40 ppm, up to more than 1,000 ppm of nickel and vanadium (a combined total amount of nickel and vanadium) and up to about 25 wt % asphaltenes. If the feedstock contains either a combined amount of nickel and vanadium that is too large or an amount of asphaltenes that is exceptionally large, the feedstock can be subjected to a preliminary treatment to reduce the excessive amount of the particular contaminant. Such preliminary treatment will comprise a suitable hydrogenation treatment for the removal of metals from the feedstock and/or the conversion of asphaltenes in the feedstock to reduce the contaminants to satisfactory levels, such treatment employing any suitable relatively cheap catalyst. The above-mentioned contaminants will deleteriously affect the subsequent processing of such feedstocks, if they are not lowered to acceptable levels.

Typical feedstocks that can be treated satisfactorily by the process of the present invention will often contain a substantial amount of components that boil appreciably above 1,000° F. Examples of typical feedstocks are crude oils, topped crude oils, petroleum hydrocarbon residua, both atmospheric and vacuum residua, oils obtained from tar sands and residua derived from tar sands oil, and hydrocarbon streams derived from coal. Such hydrocarbon streams contain organometallic contaminants which create deleterious effects in various refining processes that employ catalysts in the conversion of the particular hydrocarbon stream being treated. The metallic contaminants that are found in such feedstocks include, but are not limited to, iron, vanadium, and nickel.

Nickel is present in the form of soluble organometallic compounds in most crude oils and residuum fractions. The presence of nickel porphyrin complexes and other nickel organometallic complexes causes severe difficulties in the refining and utilization of heavy hydrocarbon fractions, even if the concentrations of such complexes are relatively small. It is known that a cracking catalyst deteriorates rapidly and its selectivity changes when in the presence of an appreciable quantity of the organometallic nickel compounds. An appreciable quantity of such organometallic nickel compounds in feedstocks that are being hydrotreated or hydrocracked harmfully affects such processes. The catalyst becomes deactivated and plugging or increasing of the pressure drop in a fixed-bed reactor results from the deposition of nickel compounds in the interstices between catalyst particles.

Iron-containing compounds and vanadium-containing compounds are present in practically all crude oils that are associated with the high Conradson carbon asphaltic and/or asphaltenic portion of the crude. Of course, such metals are concentrated in the residual bottoms, when a crude is topped to remove those fractions that boil below about 232° C. (450° F.) to 316° C. (600° F.). If such residuum is treated by additional processes, the presence of such metals adversely affects the catalyst in such processes. It should be pointed out that nickel-containing compounds deleteriously affect cracking catalysts to a greater extent than do iron-containing compounds. If an oil containing such metals is used as a fuel, the metals will cause poor fuel oil performance in industrial furnaces, since they corrode the metal surface of the furnaces.

While metallic contaminants, such as vanadium, nickel, and iron, are often present in various hydrocarbon streams in rather small amounts, they are often found in concentrations in excess of 40 to 50 ppm by weight, often in excess of 1,000 ppm. Of course, other metals are also present in a particular hydrocarbon stream. Such metals exist as the oxides or sulfides of the particular metal, or they are present as a soluble salt of the particular metal, or they are present as high-molecular weight organometallic compounds, including metal naphthenates and metal porphyrins, and derivatives thereof. In any event, the feedstock can be treated for demetallization prior to use in the process of the present invention, if the total amount of nickel and vanadium is excessive.

In addition, the feedstock may contain asphaltenes in an amount within the range of about 0 wt % to about 25 wt %, nitrogen in an amount within the range of about 0.05 wt % to about 1 wt %, and sulfur in an amount within the range of about 1 wt % to about 10 wt %.

Broadly, according to the present invention, there is provided a process for the hydrotreating of a heavy hydrocarbon stream containing metals, asphaltenes, nitrogen compounds, and sulfur compounds, which process comprises contacting said stream in a first reaction zone in the presence of hydrogen and under suitable hydrotreating conditions with a first catalyst comprising a hydrogenating component selected from the group consisting of a metal of Group VIB of the Periodic Table of Elements, a metal of Group VIII of the Periodic Table of Elements, and a mixture thereof deposed upon a porous inorganic oxide support, said hydrogenating component being present as the element, as oxides, as sulfides, or mixtures thereof, and said first catalyst having a surface area of about 120 m$^2$/gm to about 400 m$^2$/gm, a pore volume within the range of about 0.7 cc/gm to about 1.5 cc/gm, and an average pore diameter within the range of about 12.5 nm (125 Å) to about 35 nm (350 Å) to obtain a first effluent; contacting said first effluent in a second reaction zone in the presence of hydrogen and under suitable hydrotreating conditions with a second catalyst consisting essentially of at least one active original hydrogenation metal selected from Group VIB deposed on a catalytically-active support comprising alumina, said Group VIB metal of said second catalyst being present as an element, as the oxide, as the sulfide, or mixtures thereof, said second catalyst having a surface area within the range of about 150 m$^2$/gm to about 300 m$^2$/gm, a majority of its pore volume in pore diameters within the range of about 8 nm (80 Å) to about 13 nm (130 Å), and a pore volume within the range of about 0.4 cc/gm to about 0.9 cc/gm to provide a second effluent; and contacting said second effluent in a third reaction zone in the presence of hydrogen and under suitable hydrotreating conditions with a third catalyst comprising a hydrogenating component selected from the group consisting of (1) molybdenum, chromium, and a small amount of cobalt, (2) their oxides, (3) their sulfides, and (4) mixtures thereof on a large-pore, catalytically-active alumina, said third catalyst having a pore volume within the range of about 0.4 cc/gm to about 0.8 cc/gm, a surface area within the range of about 150 m$^2$/gm to about 300 m$^2$/gm, and an average pore diameter within the range of about 10 nm (100 Å) to about 20 nm (200 Å), to provide a product having reduced amounts of metals, asphaltenes, nitrogen compounds, and sulfur compounds.

It is to be understood that as used herein all values that are given for surface area would be those that are obtained by the BET nitrogen absorption method; values that are given for pore volume would be those that are obtained by nitrogen absorption plus mercury penetration for those values that are related to pore diameters that are above 120 nm (1,200 Å); and all values that are given for average pore diameter would be those that are calculated by means of the expression A.P.D.=(4×P.V.×10$^4$/S.A.), wherein A.P.D.=average pore diameter in Å, P.V.=pore volume in cc/gm, and S.A.=surface area in m$^2$/gm.

This method of determining average pore diameter is discussed by F. C. Ciapetta and D. S. Henderson in an article in *Oil & Gas Journal*, Vol. 65, Page 88(1967).

The three catalysts of the process of the present invention can be employed in a single reactor as a multiple-bed system, or the three catalysts can be employed in two or more separate and sequential reactors. Hence, all three reaction zones can be in a single reactor or the three reaction zones can be suitably spread out through two or more reactors. The catalysts can be employed in two reactors having one of the two reactors containing two distinct beds of catalysts or, perhaps, each of the reactors can contain two or more beds of the catalysts. Such combinations can be employed to achieve flexibility of operation and product upgrade. In a commercial operation, any of the reactor schemes can comprise multiple beds of catalysts.

In any reactor system that is used in the process of this invention, the volumetric ratio of the first catalyst to the second catalyst can be within a broad range, for example, within the range of about 5:1 to about 1:1, and preferably within the range of about 2:1 to 0.3:1.

The first catalyst of the process of the present invention, a demetallization catalyst, comprises a hydrogenation component and a large-pore, high-surface area inorganic oxide support, such as an alumina. The hydrogenation component typically comprises a metal of Group VIB of the Periodic Table of Elements, a metal of Group VIII of the Periodic Table of Elements, or a mixture thereof deposed on a porous inorganic oxide support. The Periodic Table of Elements referred to herein is found on page 628 of *Webster's Seventh New Collegiate Dictionary*, G. & C. Merriam Company, Springfield, Massachusetts, U.S.A. (1965). The composition of this first catalyst comprises suitably about 0.5 wt % to about 30 wt % of the metal of Group VIB, calculated as the oxide, and/or from about 0.5 wt % to about 12 wt % of the metal of Group VIII, calculated as the oxide, each quantity being based upon the total weight of the catalytic composition. While the metals are calculated as the oxides, they can be present in the catalytic composition as the element, as oxides, as sulfides, or mixtures thereof. When the first catalyst of the process of the present invention is prepared to contain both a metal of Group VIB and a metal of Group VIII, the metal of Group VIII should be limited to an amount that is less than about 3 wt %, calculated as the oxide and based upon the total weight of the catalyst, in order to minimize the catalyst deactivation influence of the metal of Group VIII, particularly a component comprising cobalt, when the catalyst is used in the hydrotreatment of asphaltenic heavy hydrocarbon stream containing a substantial amount of metals. Preferably, the hydrogenating component of the first catalyst comprises only a single active original hydrogenating metal that is selected from Group VIB of the Periodic Table of Elements or Group VIII of the Periodic Table of Elements. The term "single active original hydrogenating metal" is used herein to refer to only the one hydrogenating metal that is incorporated into the catalyst during its preparation and does not include any metal that is deposited upon the catalyst during the use of the catalyst in any process. Molybdenum, which is generally superior to chromium and tungsten for demetallization and desulfurization activity, is a preferred Group VIB metal in this first catalyst. Although a Group VIB metal provides superior demetallization activity to that provided by a Group VIII metal, nickel is a preferred Group VIII metal in this first catalyst, if a Group VIII metal is employed. Preferably, the Group VIB or Group VIII metal is present in an amount of about 0.5 wt % to about 5 wt %, and most preferably about 1 wt % to about 4 wt %, in order that the first catalyst may provide sufficient demetallization activity while containing a minimum amount of hydrogenating metal.

The catalyst support material that is employed in the first reaction zone of the process of the present invention is a large-pore, high-surface area inorganic oxide support. A suitable support material is a catalytically-active alumina, which can be a gamma-alumina, an eta-alumina, or mixtures thereof. Such aluminas provide a surface area within the range of about 150 m²/gm to about 800 m²/gm.

The first catalyst can be prepared by impregnating a suitable support material, e.g., an appropriate commercially available alumina, which support material has been preferably calcined at a temperature within the range of about 426° C. (800° F.) to about 872° C. (1,600° F.) for a period of time within the range of about 0.5 hr to about 10 hr. The support material should be selected in order to enable the finished catalyst to have an average pore diameter of about 12.5 nm (125 Å) to about 35 nm (350 Å), a surface area within the range of about 120 m²/gm to about 400 m²/gm, and a pore volume within the range of about 0.7 cc/gm to about 1.5 cc/gm. The impregnation can be performed with a solution, usually aqueous, containing a heat-decomposable compound of the metal that is to be placed upon the catalyst, drying, and calcining the impregnated material. Typically, the drying can be performed in air for a period of about 1 hr to about 16 hr at a temperature of about 65° C. (150° F.) to about 204° C. (400° F.). The calcination can be performed for a period of from about 0.5 hr to about 8 hr at a temperature within the range of about 426° C. (800° F.) to about 648° C. (1,200° F.). If two metals are to be impregnated upon the support material during the preparation of the first catalyst of the process of the present invention, these metals can be applied simultaneously by using a single solution or they can be impregnated upon the support material through the use of two solutions.

The second catalyst that is employed in the process of the present invention comprises a Group VIB metal deposed upon a catalytically-active alumina support having certain physical properties. The support can be obtained by first calcining pseudo-boehmite in static air for a period of time within the range of about ½ hr to about 2 hr at a temperature within the range of about 426° C. (800° F.) to about 759° C. (1,400° F.) to produce a gamma-alumina. The gamma-alumina is subsequently impregnated with a solution, preferably aqueous, containing a heat-decomposable salt of the metal of Group VIB of the Periodic Table of Elements. Molybdenum is the preferred Group VIB metal, since molybdenum is generally superior to chromium and tungsten in providing desulfurization activity. Of course, combinations of the Group VIB metals can be employed. The impregnated material is then dried and calcined as described hereinabove. The hydrogenating metal can be present in the second catalyst in an amount within the range of about 5 wt % to about 25 wt %, or greater, calculated as the trioxide of the respective metal and based upon the weight of the second catalyst. Preferably, the metal is present in an amount within the range of about 5 wt % to about 15 wt %, and more preferably within the range of about 8 wt % to 12 wt %, calculated as the trioxide and based upon the second-catalyst weight. The more preferable quantity of hydrogenating metal has been found to provide optimum desulfurization activity with a minimum amount of hydrogenating metal.

The prepared second catalyst that is employed in the process of the present invention has a pore volume within the range of about 0.4 cc/gm to about 0.9 cc/gm, a surface area within the range of about 150 m²/gm to about 300 m²/gm, and an average pore diameter within the range of about 9 nm (90 Å) to about 16 nm (160 Å). Preferably, the second catalyst has a pore volume within the range of about 0.5 cc/gm to about 0.7 cc/gm, a surface area within the range of about 150 m²/gm to about 250 m²/gm, and an average pore diameter within the range of about 11 nm (110 Å) to about 14 nm (140 Å).

In order to provide maximum desulfurization activity, the second catalyst should have less than 40% of its pore volume in pores having diameters within the range of about 5 nm (50 Å) to about 8 nm (80 Å), about 45% to about 90% of its pore volume in pores having diameters within the range of about 8 nm (80 Å) to about 13 nm (130 Å), and less than about 15% of its pore volume in pores having diameters that are greater than 13 nm (130 Å). More preferably, the second catalyst of the process of the present invention has a pore volume distribution wherein less than 40% of its pore volume is in pores having diameters within the range of about 5 nm (50 Å) to about 8 nm (80 Å), about 25% to about 65% of its pore volume in pores having diameters within the range of about 8 nm (80 Å) to about 10 nm (100 Å), about 10% to about 50% of its pore volume in pores having diameters within the range of about 10 nm (100 Å) to about 13 nm (130 Å), and less than 5% of its pore volume in pores having diameters that are greater than 13 nm (130 Å)

The pores of the second catalyst having diameters within the range of about 8 nm (80 Å) to about 13 nm (130 Å) should contain a surface area within the range of about 90 m²/gm to about 180 m²/gm and, more preferably, 120 m²/gm to about 180 m²/gm, in order to obtain a maximum activity for desulfurization.

The third catalyst that is employed in the process of the present invention comprises a hydrogenating component selected from the group consisting of (1) molybdenum, chromium, and a small amount of cobalt, (2) their oxides, (3) their sulfides, and (4) mixtures thereof on a large-pore, catalytically-active alumina, said catalyst having a pore volume within the range of about 0.4 cc/gm to about 0.8 cc/gm, a surface area within the range of about 150 m²/gm to about 300 m²/gm, and an average pore diameter within the range of about 10 nm (100 Å) to about 20 nm (200 Å). The hydrogenating component, which comprises cobalt, molybdenum, and chromium, has these metals present in the elemental form, as oxides of the metals, as sulfides of the metals, or mixtures thereof. The cobalt is present in an amount within the range of about 0.1 wt % to about 5 wt %, calculated as cobalt oxide (CoO) and based upon the third-catalyst weight. The molybdenum is present in an amount within the range of about 5 wt % to about 15 wt %, calculated as molybdenum trioxide (MoO₃) and based upon the third-catalyst weight. The chromium is present in an amount within the range of about 5 wt % to about 20 wt %, calculated as chromium trioxide (Cr₂O₃) and based upon the third-catalyst weight. Preferably, the cobalt is present in an amount within the range of about 1 wt % to about 3 wt %, calculated as CoO and based upon the third-catalyst weight, the molybdenum is present in an amount within the range of about 7 wt % to about 13 wt %, calculated as MoO₃ and based upon the third-catalyst weight, and the chromium is present in an amount within the range of about 6 wt % to about 15 wt %, calculated as Cr₂O₃ and based upon the third-catalyst weight.

Suitable catalytically-active, large-pore aluminas which can be employed in the third catalyst of the process of the present invention are available. A typical example of such an alumina is Aero-100 alumina, manufactured by the American Cyanamid Company. The alumina should have a pore volume that is in excess of 0.4 cc/gm, a surface area that is in excess of 150 m²/gm, and an average pore diameter that is greater than 10 nm (100 Å).

Typically, the third catalyst that is employed in the process of the present invention can be prepared by impregnating the various metals upon the suitable catalytically-active, large-pore alumina. Such impregnation may be accomplished with one or more solutions of heat-decomposable compounds of the appropriate metals. The impregnation can be a co-impregnation, when a single solution of the metals is employed. Alternatively, impregnation can be accomplished by the sequential impregnation of the various metals from two or more solutions of the heat-decomposable compounds of the appropriate metals. The impregnated support is dried at a temperature of at least 121° C. (250° F.) for a period of at least 1 hour and calcined in air at a temperature of at least 538° C. (1,000° F.) for a period of time of at least 2 hours. Preferably, the third catalyst that is used in the process of the present invention is prepared by first calcining pseudoboehmite in static air at a temperature of about 427° C. (800° F.) to about 760° C. (1,400° F.) for a period of time within the range of about ½ hour to about 2 hours to produce a gamma-alumina. This gamma-alumina is subsequently impregnated with the aqueous solution or solutions containing the heat-decomposable salts of the cobalt, molybdenum, and chromium.

The finished third catalyst that is employed in the process of the present invention has a pore volume within the range of about 0.4 cc/gm to about 0.8 cc/gm, a surface area within the range of about 150 m²/gm to about 300 m²/gm, and an average pore diameter within the range of about 10 nm (100 Å) to about 20 nm (200 Å). Preferably, the catalyst has a pore volume within the range of about 0.5 cc/gm to about 0.7 cc/gm, a surface area within the range of about 150 m²/gm to about 250 m²/gm, and an average pore diameter within the range of about 11 nm (110 Å) to about 15 nm (150 Å).

The third catalyst employed in the process of the present invention should have about 0% to about 10% of its pore volume in pores having diameters that are smaller than 5 nm (50 Å), about 30% to about 80% of its pore volume in pores having diameters of about 5 nm (50 Å) to about 10 nm (100 Å), about 10% to about 50% of its pore volume in pores having diameters of about 10 nm (100 Å) to about 15 nm (150 Å), and about 0% to about 10% of its pore volume in pores having pores that are larger than 15 nm (150 Å).

The process of the subject application is particularly useful for hydrotreating heavy hydrocarbon streams such as petroleum residua, both atmospheric resids and vacuum resids, tar sands oils, tar sands resids, and liquids obtained from coal.

Suitable operating conditions that are employed in both the first reaction zone and the second reaction zone comprise a hydrogen partial pressure within the range of about 6,900 kPa (1,000 psia) to about 20,700 kPa (3,000 psia), an average catalyst bed temperature within the range of about 371° C. (700° F.) to about 454° C. (850° F.), a liquid hourly space velocity (LHSV) within the range of about 0.1 volume of hydrocarbon per hour per volume of catalyst to about 5 volumes of hydrocarbon per hour per volume of catalyst, and a hydrogen recycle rate or hydrogen addition rate within the range of about 356 m³/m³ (2,000 standard cubic feet per barrel [SCFB]) to about 2,671 m³/m³ (15,000 SCFB). Preferably, the operating conditions for both the first reaction zone and the second reaction zone comprise a hydrogen partial pressure within the range of about 8,270 kPa (1,200 psia) to about 13,800 kPa (2,000 psia), an average catalyst bed temperature within the range of about 388° C. (730° F.) to about 438° C. (820° F.), an LHSV within the range of about 0.3 to about 4, and a hydrogen recycle rate or hydrogen addition rate within the range of about 890 m³/m³ (5,000 SCFB) to about 1,781 m³/m³ (10,000 SCFB).

The operating conditions that are employed in the third reaction zone of the process of the present invention comprise a hydrogen partial pressure within the range of about 6,900 kPa (1,000 psia) to about 20,700 kPa (3,000 psia), an average catalyst bed temperature within the range of about 371° C. (700° F.) to about 438° C. (820° F.), an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 356 m³/m³ (2,000 SCFB) to about 2,671 m³/m³ (15,000 SCFB). Preferably, the operating conditions for the third reaction zone comprise a hydrogen partial pressure within the range of about 8,270 kPa (1,200 psia) to about 13,800 kPa (2,000 psia), an average catalyst bed temperature within the range of about 380° C. (730° F.) to about 432° C. (810° F.), an LHSV within the range of about 0.4 volume of hydrocarbon per hour per volume of catalyst to about 1 volume of hydrocarbon per hour per volume of catalyst, and a hydrogen recycle rate or hydrogen addition rate within the range of about 890 m³/m³ (5,000 SCFB) to about 1,781 m³/m³ (10,000 SCFB).

A preferred embodiment of the process of the present invention is presented in the accompanying FIG. 1, which is a simplified flow diagram and does not show numerous pieces of auxiliary equipment, such as pumps, compressors, heat exchangers, and valves. Since one having ordinary skill in the art would recognize easily the need for and location of such auxiliary equipment, its omission is appropriate and facilitates the simplification of the figure. This process scheme is presented for the purpose of illustration only and is not intended to limit the scope of the present invention.

Referring to FIG. 1, an Ardeshir vacuum resid having the properties presented in Table I hereinbelow is withdrawn from source 10 through line 11 into pump 12, whereby it is pumped through line 13. A hydrogen-containing recycle gas stream, discussed hereinafter, is passed from line 14 into line 13 to be mixed with the hydrocarbon stream therein to form a mixed hydrogen-hydrocarbon stream. The mixed hydrogen-hydrocarbon stream is then passed from line 13 into furnace 15, where it is heated to a temperature within the range of about 371° C. (700° F.) to about 454° C. (850° F.). The heated stream is then passed through line 16 into first reaction zone 17. The effluent from first reaction zone 17 is subsequently passed through line 18 into second reaction zone 19. Similarly, the effluent from second reaction zone 19 is passed through line 20 into third reaction zone 21. Optionally, hydrogen-containing gas can be added to effluent from the first reaction zone and/or the effluent from the second reaction zone via lines 14a and 14b, respectively.

The first reaction zone contains one or more beds of an embodiment of the first catalyst of the process of the present invention, namely, a catalyst containing 1 wt % $MoO_3$ on a large-pore alumina, which first catalyst has the properties described hereinabove. The second reaction zone contains one or more beds of an embodiment of the second catalyst of the process of the present invention, namely, a catalyst containing 10 wt % $MoO_3$ deposed on a catalytically active alumina, which catalyst has the properties described hereinabove for the second catalyst. The third reaction zone 21 contains one or more beds of an embodiment of the third catalyst of the process of the present invention, namely, 1 wt % CoO, 8 wt % $MoO_3$, and 8wt % $Cr_2O_3$ deposed upon an alumina, said third catalyst having the properties described hereinabove for the third catalyst. The catalyst in each of these three reaction zones can be employed in the form of one or more fixed beds or as one or more ebullating beds.

The effluent from the third reaction zone 21 is passed into high-temperature, high-pressure, gas-liquid separator 23 by way of line 22. This separator 23 is operated at reactor temperature and pressure. In separator 23, hydrogen-containing gas is separated from the rest of the effluent. The hydrogen-containing gas is subsequently passed from separator 23 through line 24. It is cooled and sent into light-hydrocarbon separator 25, wherein the condensed light hydrocarbons are separated from the hydrogen-containing gas and withdrawn via line 26. The hydrogen-containing gas is removed by way of line 27 and passed into scrubber 28, wherein the hydrogen sulfide is removed or scrubbed from the gas. The hydrogen sulfide is then removed from the system by way of line 29. The scrubbed hydrogen-containing gas is passed subsequently through line 14, where it can be joined by make-up hydrogen, if necessary, via line 30. The hydrogen-containing gas stream is then added to the hydrocarbon stream in line 13, as described hereinabove.

The liquid portion of the effluent from the third reaction zone 21 is passed from the high-temperature, high-pressure, gas-liquid separator 23 by way of line 31 to high-temperature flash drum 32. In flash drum 32, the pressure is reduced to atmospheric pressure and the temperature of the material is within the range of about 371° C. (700° F.) to about 427° C. (800° F.). In flash drum 32, the light hydrocarbons containing not only the naphtha, but also those distillates boiling up to a temperature of about 288° C. (550° F.) to about 316° C. (600° F.), such as fuel oil, are flashed from the rest of the product and are removed from the system by way of line 33. Such light hydrocarbons can be separated into their various components and sent to storage or to other processing units.

The heavier material that is separated from the light hydrocarbons, that is, material that boils at a temperature above about 316° C. (600° F.), is removed from flash drum 32 by way of line 34 for use as feeds to other processes or as a low-sulfur, heavy industrial fuel. The material boiling above about 316° C. (600° F.) that is removed from flash drum 32 via line 34 can be sent by way of line 35 to a resid catalytic cracking unit (not shown).

The following examples are presented to facilitate the understanding of the present invention and are presented for the purposes of illustration only and are not intended to limit the scope of the present invention.

EXAMPLE I

Three catalysts were used in the tests described hereinafter. These catalysts, which are identified as Catalysts A, B, and C, were prepared as described in the following paragraphs.

Catalyst A was prepared to contain approximately 1 wt % active $MoO_3$ on Aero 100 alumina. A semicommercial batch of catalyst (approximately 200 lb) was prepared by the American Cyanamid Company. This catalyst, in the form of 0.079-cm (1/32-in) extrudates, was comprised of 1 wt % $MoO_3$ on a KSA light alumina obtained from the Kaiser Chemical Company. Testing of this catalyst demonstrated that it was not an active catalyst. The molybdenum hydrogenating metal had not been distributed properly on the surface of the alumina.

A 50-lb portion of this inactive material was impregnated with a solution of $(NH_4)_6Mo_7O_{24}\cdot 4H_2O$, which solution had been prepared by dissolving 280 gm of the $(NH_4)_6Mo_7O_{24}\cdot 4H_2O$ in 2 liters of hot distilled water and subsequently diluting the resulting solution with 14 gal of distilled water. The solution and solid support material were mixed and permitted to stand for a period of 5 hr. The resulting impregnated material was then placed on trays and dried in an oven in flowing air at a temperature of 121° C. (250° F.) for approximately 24 hr and calcined in air for 2 hr at a temperature of 538° C. (1,000° F.). The calcined material, identified as Catalyst A, was found to have 2.1 wt % MoO$_3$, a surface area of 202 m$^2$/gm, a pore volume of 0.9137 cc/gm, and a calculated average pore diameter of 18.1 nm (181 Å).

Catalyst B was prepared to contain 10 wt. % MoO$_3$ on KSA light alumina. The KSA light alumina obtained from the Kaiser Chemical Company was extruded into 0.16-cm (1/16-in) extrudates and calcined in still air for 2 hr at a temperature of 538° C. (1,000° F.). A 96-gm (approximately 300-cc) portion of the calcined extrudates was impregnated with a solution that had been prepared by dissolving 13.4 gm of (NH$_4$)$_6$Mo$_7$O$_{24}$.4H$_2$O in 200 ml of distilled water. The solution and extrudates were mixed and permitted to stand overnight (approximately 16 hr). Any excess water was removed with a heat lamp and the resulting dried material was calcined in still air for 2 hr at a temperature of 538° C. (1,000° F.). Catalyst B had a surface area of 204 m$^2$/gm, a pore volume of 0.8160 cc/gm, and a calculated average pore diameter of 16 nm (160 Å).

Catalyst C was prepared to contain 1.1 wt % CoO, 8.2 wt % Cr$_2$O$_3$, and 8.2 wt % MoO$_3$ on an alumina. A 570.6-gm (approximately 1,000-cc) portion of Aero 100 A alumina obtained from the American Cyanamid Company was impregnated with a solution that had been prepared by dissolving 74.3 gm of (NH$_4$)$_6$Mo$_7$O$_{24}$.4H$_2$O and 95.2gm of (NH$_4$)$_2$Cr$_2$O$_7$ in 800 ml of distilled water. Prior to impregnation, the alumina had been ground to a 14/20 mesh (U.S. Sieve Series) material, i.e., a material that would pass through a 14-mesh screen (U.S. Sieve Series) but would be retained on a 20-mesh screen (U.S. Sieve Series). The solution and solids were mixed and permitted to stand overnight (approximately 16 hr). Then the material was dried under a heat lamp to remove excess water and calcined in still air for 2 hr at a temperature of 538° C. (1,000° F.). The calcined material was impregnated subsequently with a solution that had been prepared by dissolving 21.5 gm of Co(NO$_3$)$_2$.6H$_2$O in 700 ml of distilled water. The solution and solids were mixed and permitted to stand overnight (approximately 16hr). The impregnated material was dried under a heat lamp to remove the excess water and calcined in still air for 2 hr at a temperature of 538° C. (1,000° F.). This calcined material was Catalyst C.

Each of the above catalysts was tested in the form of 14/20-mesh material, i.e., a material that would pass through a 14-mesh screen (U.S. Sieve Series), but be retained on a 20-mesh screen (U.S. Sieve Series).

Example II

Catalyst A was tested in a bench-scale test unit for its ability to convert an Ardeshir vacuum resid, identified hereinafter as Feed No. 1. The properties of Feed No. 1 are shown hereinafter in Table I.

TABLE I

| FEEDSTOCK PROPERTIES | | | |
|---|---|---|---|
| Feed No. | 1 | 2 | 3 |
| Carbon, wt % | 83.83 | 84.92 | 86.34 |
| Hydrogen, wt % | 10.15 | 10.44 | 10.98 |
| Sulfur, wt % | 5.0 | 3.79 | 1.88 |
| Nitrogen, wt % | 0.51 | 0.478 | 0.438 |
| Oxygen, wt % (by difference) | 0.51 | — | — |
| Gravity, °API | 5.1 | — | |
| Ramsbottom Carbon, wt % | 21.0 | 18.12 | 11.80 |
| Nickel, wt % | 59 | 40 | 25 |
| Vanadium, wt % | 212 | 88 | 34 |
| 1000° F.—, wt % | 3.7 | 20.1 | 36.8 |
| Asphaltenes, wt % | 11.2 | 6.88 | 4.97 |

In this run, hydrocarbon feed was pumped to the unit by means of a Ruska pump (a positive-displacement pump). The feedstock was combined with a once-through stream of hydrogen and the mixture was passed into the top of and down through the reactor of the test unit. Effluent from the reactor was sent to a high-pressure separator at process pressure. In the separator, gaseous products were separated from liquid products and the liquid products were sent through a level control valve to sample receivers where the liquid was collected at atmospheric pressure. Nitrogen was bubbled through the liquid samples at low rates to strip any remaining hydrogen sulfide from each sample. The gaseous products were passed through a pressure control valve and a wet test meter and subsequently vented to the atmosphere.

The reactor of the test unit was fabricated from 1.27-cm (½-in) Schedule 80 stainless steel pipe. The reactor was 86.4 cm (34 in) in length. A 0.32-cm (⅛-in) coaxial thermowell extended up through the reactor. A traveling thermocouple was employed in this thermowell. Near isothermal conditions were achieved by three electrical heaters separately controlled by Eurotherm temperature controllers. All lines were electrically heated and controlled by Eurotherm controllers. Catalyst bed temperatures were measured and recorded by the traveling thermocouple.

The catalyst sample that was to be used in the test unit was first calcined in air for 2 hr at a temperature of 538° C. (1,000° F.), cooled in a dessicator, and blown free of catalyst fines with nitrogen. The catalyst, as 14/20-mesh material, was loaded into the reactor on top of 0.32-cm (⅛-in) alumina balls. The catalyst was loaded with gentle tapping of the reactor to assure proper catalyst packing. Alumina balls were also placed in the reactor above the catalyst bed.

Immediately after it was charged to the reactor, the catalyst was presoaked with a warm (65.6° C. [150° F.]), high-sulfur gas oil. This gas oil was slowly introduced from the bottom of the reactor in order to eliminate any air pockets that might exist therein. The reactor was filled to the reactor inlet with the gas oil and kept at the temperature and atmospheric pressure overnight (approximately 16 hr).

The test unit was then started up with the high-sulfur gas oil being pumped at a rate of 240 cc/hr for 2 hr at a pressure of 10,350 kPa (1,500 psig), a hydrogen flow rate of about 0.45 m$^3$/hr (2.5 standard cubic feet per hour), and a temperature over the 2 hr that ranged from about 204° C. (400° F.) to about 316° C. (600° F.). Then the flow rate was reduced to 60 cc/hr for one week and the temperature was maintained at 316° C. (600° F.) for that week. The Ardeshir vacuum resid, Feed No. 1, was introduced into the reactor at a rate of 60 cc/hr and the reactor temperature was increased from 316° C. (600° F.) to 413° C. (775° F.) over a period of 4 hr.

Figure 2:
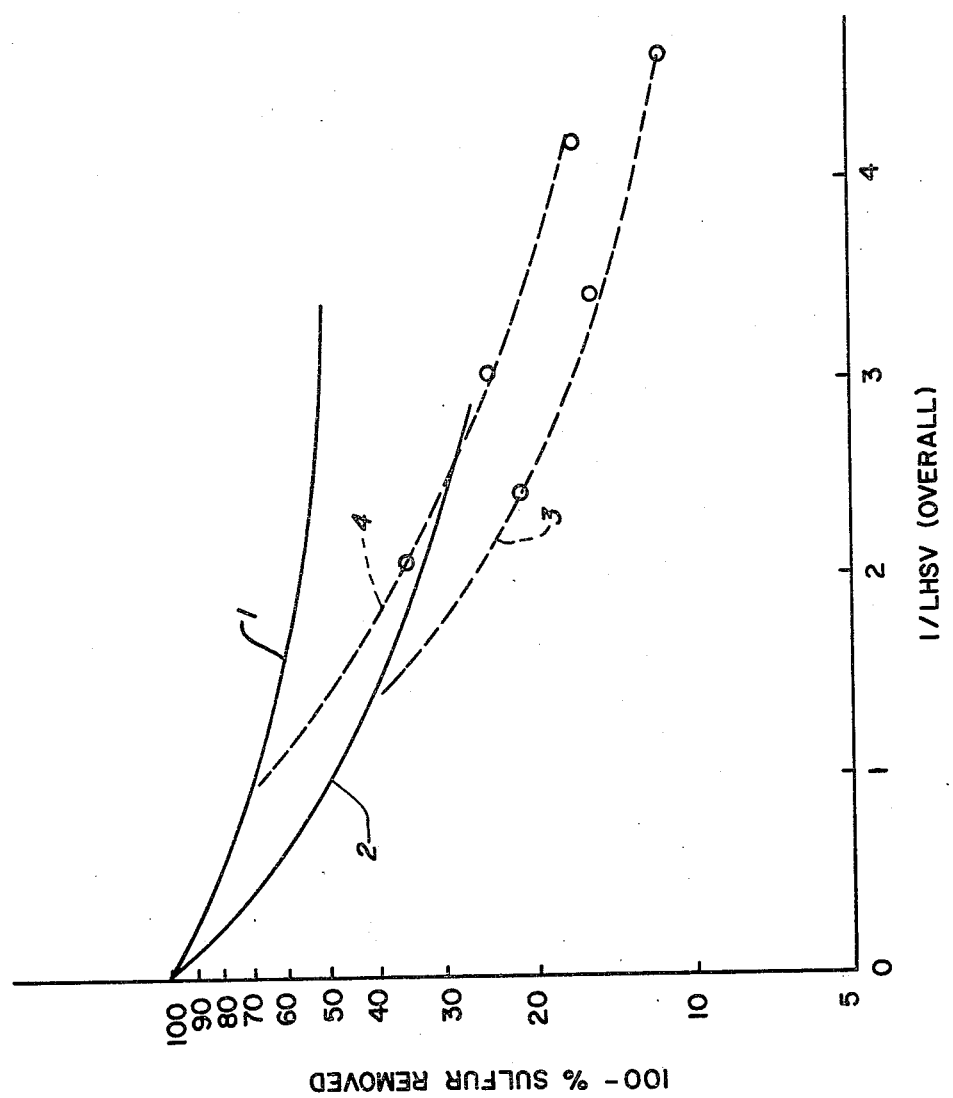
FIG. 2 presents a plot of the quantity "100-% sulfur removed" versus "reciprocal space velocity" for the hydrotreating of an Ardeshir vacuum resid when using several catalyst systems, including the catalyst scheme of the process of the present invention.

The test, which is identified hereinafter as Test No. 1, was conducted for 2,564 hr. Liquid product was accumulated over a period of time and this accumulated product was employed as the feedstock in a test described hereinafter. This new feedstock was identified as Feed No. 2, the properties of which are presented hereinabove in Table I. The performance of the Catalyst A is represented in the accompanying FIG. 2 by line 1. FIG. 2 presents the performances of various catalyst systems expressed in terms of sulfur removal plotted against reciprocal LHSV.

The operating conditions that were employed during Test No. 1 were a temperature within the range of 399° C. (750° F.) to 421° C. (790° F.), a pressure within the range of 8,970 kPa (1,300 psig) to 12,420 kPa (1,800 psig), a once-through hydrogen addition rate within the range of 1,068 m$^3$/m$^3$ (6,000 SCFB) to 2,848 m$^3$/m$^3$ (16,000 SCFB), and an LHSV within the range of 0.46 volume of hydrocarbon per hour per volume of catalyst to 1.84 volumes of hydrocarbon per hour per volume of catalyst.

EXAMPLE III

A two-catalyst system was employed in a second test, identified hereinafter as Test No. 2, to convert Feed No. 1.

Test No. 2 was carried out in a bench-scale test unit having automatic controls for pressure, flow of reactants, and temperature. The reactor was made from 0.95-cm ($\frac{3}{8}$-in) I.D. staninless steel, heavy-walled tubing. A 0.32-cm ($\frac{1}{8}$-in) O.D. thermowell extended up through the center of the reactor. The reactor was heated by an electrically-heated steel block. The hydrocarbon feedstock was fed to the unit by means of a Ruska pump. Each catalyst was employed as 14/20-mesh material, i.e., material that would pass through a 14-mesh sieve (U.S. Sieve Series) but be retained upon a 20-mesh sieve (U.S. Sieve Series). Catalyst A was placed on top of Catalyst B in the reactor, and Catalyst B was supported by 8/10-mesh alundum particles. The total amount of catalyst that was charged for this test was approximately 13.3 cubic centimeters of catalysts. This provided a total catalyst bed length of about 17.8 cm (7 in). A layer of 8/10-mesh alundum particles was placed over the catalyst bed in the reactor. The catalyst that was employed was located in the annular space between the thermowell and the internal wall of the 0.95-cm ($\frac{3}{8}$-in) I.D. reactor.

Prior to their use, the catalysts were calcined in still air at a temperature of approximately 538° C. (1,000° F.) for 1 hr. The catalyst material was cooled in a dessicator and charged to the reactor as described hereinabove.

The catalyst system was subjected to a pretreatment. The reactor was placed in the reactor block at a temperature of about 149° C. (300° F.). A gas mixture containing 8 mole % hydrogen sulfide in hydrogen was passed over the catalyst at a rate of 0.0283 m$^3$/hr (one standard cubic foot per hour) at a pressure of 3,450 kPa (500 psig) and a temperature of about 149° C. (300° F.). After 10 to 15 minutes of such treatment, the temperature of the block was raised to 204° C. (400° F.). After at least an additional one hour of time had elapsed and at least 0.0283 m$^3$ (one standard cubic foot) of gas mixture had passed through the system, the temperature of the block was raised to 371° C. (700° F.). Then the gas mixture was passed through the catalyst bed for at least one additional hour and in an amount of at least 0.0283 m$^3$ (one standard cubic foot). At this point, the gas mixture was discontinued, hydrogen was introduced into the unit at a pressure of 8,280 kPa (1,200 psig), the flow of hydrogen was established at a rate of about 0.0169 m$^3$/hr (0.6 SCFH), and the temperature was increased to provide an average catalyst bed temperature of 404° C. (760° F.). Subsequently, the hydrocarbon feed flow was established at a rate that would provide an LHSV of 0.59 volume of hydrocarbon per hour per volume of catalyst. Effluent from the reaction zone was collected in a liquid product receiver, while the gas that was formed was passed through the product receiver to a pressure control valve and then through a wet test meter to an appropriate vent.

The results of Test No. 2 are presented in the accompanying FIG. 2 as line 2. Liquid product obtained from this test was accumulated and employed hereinafter as Feed No. 3, properties of which are presented hereinabove in Table I.

EXAMPLE IV

Two different catalyst systems were considered in the test of this example. First, a three-catalyst system of Catalyst A, Catalyst B, and Catalyst C was simulated in this test, Test No. 3. Feed No. 3, which had been obtained with the catalyst system of Catalyst A and Catalyst B, was hydrotreated in the presence of Catalyst C. Then a two-catalyst system of Catalyst A and Catalyst C was simulated in Test No. 3 by replacing Feed No. 3 with Feed No. 2, which had been obtained with Catalyst A. The experimentation was conducted as described in Example III. Feed No. 3 was used through Day 15. Then Feed No. 2 was employed from Day 16 through Day 25, after which Feed No. 3 was used again from Day 26 through Day 28. The operating conditions for each feed employed in Test No. 3 were a temperature of 416° C. (780° F.), a pressure of 11,140 kPa (1,600 psig), and three different space velocities, namely, an LHSV of 1.0 volume of hydrocarbon per hour per volume of catalyst, an LHSV of 0.503 volume of hydrocarbon per hour per volume of catalyst, and an LHSV of 0.316 volume of hydrocarbon per hour per volume of catalyst.

The results of Test No. 3 for the above three space velocities, when using Feed No. 3, are presented hereinbelow in Table II and in FIG. 2 by broken Line No. 3. In addition, the data from 8, 11, and 15 days on stream are represented as points in FIG. 2 on broken Line No. 3.

The results obtained when using Feed No. 2 are presented hereinbelow in Table III and as points and broken Line No. 4 in the accompanying FIG. 2.

FIG. 2 clearly shows that the desulfurization of the simulated three-catalyst system was superior to the desulfurization provided by any of the three other catalyst systems, including the two-catalyst system of Catalyst A and Catalyst B, an embodiment of the two-catalyst system disclosed in U.S. Pat. 4,212,729 discussed hereinabove. The simulated three-catalyst system employed in Test No. 3, which represents a preferred embodiment of the process of the present invention, consequently provides an improvement over such two-catalyst processes. Moreover, data from the 28th day on stream show that Catalyst C did not deactivate appreciably during the test run.

TABLE II

RESULTS FROM TEST NO. 3 WITH FEED NO. 3

| Days on Oil | 8 | 11 | 15 | 28 |
|---|---|---|---|---|
| Temp., °C. | 416 | 416 | 417 | 417 |
| °F. | 780 | 780 | 781 | 781 |
| LHSV, hr$^{-1}$ | 1.0 | 0.316 | 0.503 | 0.503 |
| Overall LHSV, hr$^{-1}$ | 0.41 | 0.22 | 0.29 | — |
| Pressure, psig | 1,600 | 1,600 | 1,600 | 1,600 |
| kPa | 11,140 | 11,140 | 11,140 | 11,140 |
| Product | | | | |
| Gravity, °API | 18.0 | 20.8 | 19.1 | 19.6 |
| Carbon, wt % | 86.90 | 87.24 | 87.08 | 87.19 |
| Hydrogen, wt % | 11.25 | 11.56 | 11.40 | 11.34 |
| Nitrogen, wt % | 0.418 | 0.337 | 0.386 | 0.370 |
| Sulfur, wt % | 1.10 | 0.58, 0.56 | 0.85 | 0.85 |
| Nickel, ppm | 16 | 7 | 12 | 12 |
| Vanadium, ppm | 11 | <1 | 4 | 5 |
| Ramsbottom Carbon, wt % | 9.38 | 6.60 | 8.54 | 8.40 |
| 1,000° F.—, wt % | 49.2 | 68.2 | 51.4 | — |
| Oils, wt % | 55.72 | 68.94 | 63.07 | 65.02 |
| Asphaltenes, wt % | 3.24 | 1.49 | 2.65 | 3.25 |
| Resins, wt % | 41.04 | 29.57 | 34.28 | 31.73 |
| Hydrogen Consumed, SCFB m$^3$/m$^3$ | 218 | 456 | 336 | 300 |
| C$_1$–C$_4$, wt % (on feed) | 0.68 | 1.40 | 1.08 | 1.20 |

TABLE III

RESULTS FROM TEST NO. 3 WITH FEED NO. 2

| Days on Oil | 18 | 22 | 24 |
|---|---|---|---|
| Temp., °C. | 417 | 415 | 417 |
| °F. | 781 | 779 | 781 |
| LHSV, hr$^{-1}$ | 0.503 | 1.0 | 0.316 |
| Overall LHSV, hr$^{-1}$ | 0.33 | 0.5 | 0.24 |
| Pressure, psig | 1,600 | 1,600 | 1,600 |
| kPa | 11,140 | 11,140 | 11,140 |
| Product | | | |
| Gravity, °API | 17.4 | 15.1 | 18.2 |
| Carbon, wt % | 87.49 | 86.41 | 87.10 |
| Hydrogen, wt % | 11.23 | 10.88 | 11.32 |
| Nitrogen, wt % | 0.41 | 0.41 | 0.36 |
| Sulfur, wt % | 1.25 | 1.80 | 0.83 |
| Nickel, ppm | 18 | 24 | 11 |
| Vanadium, ppm | 16 | 32 | 6 |
| Ramsbottom Carbon, wt % | 8.83 | 10.12 | 8.04 |
| 1,000° F.—, wt % | 47.2 | 36.7 | 51.3 |
| Oils, wt % | 58.79 | 56.07 | |
| Asphaltenes, wt % | 4.07 | 4.87 | 2.96 |
| Resins, wt % | 37.14 | 39.06 | |
| Hydrogen Consumed, SCFB m$^3$/m$^3$ | 523 | 342 | 667 |
| C$_1$–C$_4$, wt % (on feed) | 1.27 | 0.87 | 2.14 |

What is claimed is:

1. A process for hydrotreating a heavy hydrocarbon stream containing metals, asphaltenes, nitrogen compounds, and sulfur compounds to reduce the contents of metals, asphaltenes, nitrogen compounds, and sulfur compounds in said stream, which process comprises contacting said stream in a first reaction zone in the presence of hydrogen and under suitable hydrotreating conditions with a first catalyst comprising a hydrogenating component selected from the group consisting of a metal of Group VIB of the Periodic Table of Elements, a metal of Group VIII, and a mixture thereof deposed upon a porous inorganic oxide support, said hydrogenating component being present in the elemental form, as the oxide, as the sulfide, or mixtures thereof and said first catalyst having a surface area of about 120 m$^2$/gm to about 400 m$^2$/gm, a pore volume of about 0.7 cc/gm to about 1.5 cc/gm, and an average pore diameter within the range of about 12.5 nm (125 Å) to about 35 nm (350 Å) to provide an effluent from said first reaction zone; contacting said effluent from said first reaction zone in a second reaction zone in the presence of hydrogen and under suitable hydrotreating conditions with a second catalyst consisting essentially of at least one active original hydrogenation metal selected from Group VIB of the Periodic Table of Elements deposed on a catalytically-active support comprising alumina, said metal of Group VIB being in the elemental form, as the oxide, as the sulfide, or a mixture thereof, and said second catalyst having a surface area within the range of about 150 m$^2$/gm to about 300 m$^2$/gm, a majority of its pore volume in pore diameters within the range of about 8 nm (80 Å) to about 13 nm (130 Å), and a pore volume within the range of about 0.4 cc/gm to about 0.9 cc/gm to provide an effluent from said second reaction zone; and contacting said effluent from said second reaction zone in the presence of hydrogen and under suitable hydrotreating conditions with a third catalyst comprising (1) the metals of molybdenum, chromium, and cobalt, (2) their oxides, (3) their sulfides, or (4) mixtures thereof deposed on a large-pore, catalytically-active alumina, said third catalyst having a pore volume within the range of about 0.4 cc/gm to about 0.8 cc/gm, a surface area within the range of about 150 m$^2$/gm to about 300 m$^2$/gm, and an average pore diameter within the range of about 10 nm (100 Å) to about 20 nm (200 Å).

2. The process according to claim 1, wherein said stream is a member selected from the group consisting of atmospheric petroleum residua, vacuum petroleum residua, tar sands oils, tar sands residua, and liquids obtained from coal.

3. The process of claim 1, wherein said conditions that are employed in the first reaction zone and the second reaction zone comprise a hydrogen partial pressure within the range of about 6,900 kPa (1,000 psia) to about 20,700 kPa (3,000 psia), an average catalyst bed temperature within the range of about 371° C. (700° F.) to about 454° C. (850° F.), an LHSV within the range of about 0.1 volume of hydrocarbon per hour per volume of catalyst to about 5 volumes of hydrocarbon per hour per volume of catalyst, and a hydrogen recycle rate or hydrogen addition rate within the range of about 356 m$^3$/m$^3$ (2,000 SCFB) to about 2,671 m$^3$/m$^3$ (15,000 SCFB), and wherein said conditions that are employed in the third reaction zone comprise a hydrogen partial pressure within the range of about 6,900 kPa (1,000 psia) to about 20,700 kPa (3,000 psia), an average catalyst bed temperature within the range of about 371° C. (700° F.) to about 438° C. (820° F.), an LHSV within the range of about 0.1 volume of hydrocarbon per hour per volume of catalyst to about 3 volumes of hydrocarbon per volume of catalyst, and a hydrogen recycle rate or hydrogen addition rate within the range of about 356 m$^3$/m$^3$ (2,000 SCFB) to about 2,671 m$^3$/m$^3$ (15,000 SCFB).

4. The process according to claim 1, wherein said hydrogenating component of said first catalyst is a metal of Group VIB of the Periodic Table of Elements.

5. The process according to claim 1, wherein the metal of Group VIB of the Periodic Table of Elements of said second catalyst is molybdenum.

6. The process according to claim 1, wherein said molybdenum of said third catalyst is present in an amount within the range of about 5 wt % to about 15 wt %, calculated as MoO$_3$ and based upon the total weight of said third catalyst, said chromium of said third catalyst is present in an amount within the range of about 5 wt % to about 20 wt %, calculated as Cr$_2$O$_3$ and based upon the total weight of said third catalyst, and said cobalt of said third catalyst is present in an amount within the range of about 0.1 wt % to about 5 wt %, calculated as CoO and based upon the total weight of said third catalyst.

7. The process according to claim 1, wherein said second catalyst has less than 40% of its pore volume in pores having diameters within the range of 5 nm (50 Å) to about 8 nm (80 Å), about 15% to about 65% of its pore volume in pores having diameters within the range of about 8 nm (80 Å) to about 10 nm (100 Å), about 10% to about 50% of its pore volume in pores having diameters within the range of about 10 nm (100 Å) to about 13 nm (130 Å), and less than 15% of its pore volume in pores having diameters that are larger than 13 nm (130 Å).

8. The process according to claim 1, wherein said third catalyst has about 0% to about 10% of its pore volume in pores having diameters that are smaller than 5 nm (50 Å), about 30% to about 80% of its pore volume in pores having diameters within the range of about 5 nm (50 Å) to about 10 nm (100 Å), about 10% to about 50% of its pore volume in pores having diameters within the range of about 10 nm (100 Å) to about 15 nm (150 Å), and about 0% to about 10% of its pore volume in pores having diameters that are larger than 15 nm (150 Å).

9. The process according to claim 2, wherein said conditions that are employed in the first reaction zone and the second reaction zone comprise a hydrogen partial pressure within the range of about 6,900 kPa (1,000 psia) to about 20,700 kPa (3,000 psia), an average catalyst bed temperature within the range of about 371° C. (700° F.) to about 454° C. (850° F.), an LHSV within the range of about 0.1 volume of hydrocarbon per hour per volume of catalyst to about 5 volumes of hydrocarbon per hour per volume of catalyst, and a hydrogen recycle rate or hydrogen addition rate within the range of about 356 m$^3$/m$^3$ (2,000 SCFB) to about 2,671 m$^3$/m$^3$ (15,000 SCFB), and wherein said conditions that are employed in the third reaction zone comprise a hydrogen partial pressure within the range of about 6,900 kPa (1,000 psia) to about 20,700 kPa (3,000 psia), an average catalyst bed temperature within the range of about 371° C. (700° F.) to about 438° C. (820° F.), an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 356 m$^3$/m$^3$ (2,000 SCFB) to about 2,671 m$^3$/m$^3$ (15,000 SCFB).

10. The process according to claim 4, wherein the metal of Group VIB of the Periodic Table of Elements of said second catalyst is molybdenum.

11. The process according to claim 4, wherein said molybdenum of said third catalyst is present in an amount within the range of about 5 wt % to about 15 wt %, calculated as MoO$_3$ and based upon the total weight of said third catalyst, said chromium of said third catalyst is present in an amount within the range of about 5 wt % to about 20 wt %, calculated as Cr$_2$O$_3$ and based upon the total weight of said third catalyst, and said cobalt of said third catalyst is present in an amount within the range of about 0.1 wt % to about 5 wt %, calculated as CoO and based upon the total weight of said third catalyst.

12. The process according to claim 5, wherein said molybdenum of said third catalyst is present in an amount within the range of about 5 wt % to about 15 wt %, calculated as MoO$_3$ and based upon the total weight of said third catalyst, said chromium of said third catalyst is present in an amount within the range of about 5 wt % to about 20 wt %, calculated as Cr$_2$O$_3$ and based upon the total weight of said third catalyst, and said cobalt of said third catalyst is present in an amount within the range of about 0.1 wt % to about 5 wt %, calculated as CoO and based upon the total weight of said third catalyst.

13. The process according to claim 7, wherein said third catalyst has about 0% to about 10% of its pore volume in pores having diameters that are smaller than 5 nm (50 Å), about 30% to about 80% of its pore volume in pores having diameters within the range of about 5 nm (50 Å) to about 10 nm (100 Å), about 10% to about 50% of its pore volume in pores having diameters within the range of about 10 nm (100 Å) to about 15 nm (150 Å), and about 0% to about 10% of its pore volume in pores having diameters that are larger than 15 nm (150 Å).

14. The process according to claim 10, wherein said molybdenum of said third catalyst is present in an amount within the range of about 5 wt % to about 15 wt %, calculated as MoO$_3$ and based upon the total weight of said third catalyst, said chromium of said third catalyst is present in an amount within the range of about 5 wt % to about 20 wt %, calculated as Cr$_2$O$_3$ and based upon the total weight of said third catalyst, and said cobalt of said third catalyst is present in an amount within the range of about 0.1 wt % to about 5 wt %, calculated as CoO and based upon the total weight of said third catalyst.

15. The process according to claim 14, wherein said metal of Group VIB of the Periodic Table of Elements of said first catalyst is molybdenum and is present in an amount within the range of about 8 wt % to about 12 wt % MoO₃, calculated as MoO₃ and based upon the weight of said first catalyst and wherein said molybdenum of said second catalyst is present in an amount within the range of about 0.5 wt % to about 5 wt %, calculated as MoO₃ and based upon the weight of said second catalyst.

16. The process according to claim 15, wherein said second catalyst has less than 40% of its pore volume in pores having diameters within the range of 5 nm (50 Å) to about 8 nm (80 Å), about 15% to about 65% of its pore volume in pores having diameters within the range of about 8 nm (80 Å) to about 10 nm (100 Å), about 10% to about 50% of its pore volume in pores having diameters within the range of about 10 nm (100 Å) to about 13 nm (130 Å), and less than 15% of its pore volume in pores having diameters that are larger than 13 nm (130 Å).

17. The process according to claim 15, wherein said stream is a member selected from the group consisting of atmospheric petroleum residua, vacuum petroleum residua, tar sands oils, tar sands residua, and liquids obtained from coal.

18. The process according to claim 16, wherein said third catalyst has about 0% to about 10% of its pore volume in pores having diameters that are smaller than 5 nm (50 Å), about 30% to about 80% of its pore volume in pores having diameters within the range of about 5 nm (50 Å) to about 10 nm (100 Å), about 10% to about 50% of its pore volume in pores having diameters within the range of about 10 nm (100 Å) to about 15 nm (150 Å), and about 0% to about 10% of its pore volume in pores having diameters that are larger than 15 nm (150 Å).

19. The process according to claim 17, wherein said conditions that are employed in the first reaction zone and the second reaction zone comprise a hydrogen partial pressure within the range of about 6,900 kPa (1,000 psia) to about 20,700 kPa (3,000 psia), an average catalyst bed temperature within the range of about 371° C. (700° F.) to about 454° C. (850° F.), an LHSV within the range of about 0.1 volume of hydrocarbon per hour per volume of catalyst to about 5 volumes of hydrocarbon per hour per volume of catalyst, and a hydrogen recycle rate or hydrogen addition rate within the range of about 356 m³/m³ (2,000 SCFB) to about 2,671 m³/m³ (15,000 SCFB), and wherein said conditions that are employed in the third reaction zone comprise a hydrogen partial pressure within the range of about 6,900 kPa (1,000 psia) to about 20,700 kPa (3,000 psia), an average catalyst bed temperature within the range of about 371° C. (700° F.) to about 438° C. (820° F.), an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 356 m³/m³ (2,000 SCFB) to about 2,671 m³/m³ (15,000 SCFB).

20. The process according to claim 18, wherein said stream is a member selected from the group consisting of atmospheric petroleum residua, vacuum petroleum residua, tar sands oils, tar sands residua, and liquids obtained from coal.

21. The process according to claim 20, wherein said conditions that are employed in the first reaction zone and the second reaction zone comprise a hydrogen partial pressure within the range of about 6,900 kPa (1,000 psia) to about 20,700 kPa (3,000 psia), an average catalyst bed temperature within the range of about 371° C. (700° F.) to about 454° C. (850° F.), an LHSV within the range of about 0.1 volume of hydrocarbon per hour per volume of catalyst to about 5 volumes of hydrocarbon per hour per volume of catalyst, and a hydrogen recycle rate or hydrogen addition rate within the range of about 356 m³/m³ (2,000 SCFB) to about 2,671 m³/m³ (15,000 SCFB), and wherein said conditions that are employed in the third reaction zone comprise a hydrogen partial pressure within the range of about 6,900 kPa (1,000 psia) to about 20,700 kPa (3,000 psia), an average catalyst bed temperature within the range of about 371° C. (700° F.) to about 438° C. (820° F.), an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 356 m³/m³ (2,000 SCFB) to about 2,671 m³/m³ (15,000 SCFB).

22. A process for the hydrotreating of a heavy hydrocarbon stream containing metals, asphaltenes, nitrogen compounds, and sulfur compounds to reduce the contents of metals, asphaltenes, nitrogen compounds and sulfur compounds in said stream, which process comprises contacting said stream under suitable hydrotreating conditions in a first reaction zone in the presence of hydrogen with a first catalyst comprising molybdenum deposited upon a large-pore alumina, said molybdenum of said first catalyst being present in an amount of about 1 wt %, calculated as MoO₃ and based upon the weight of the said first catalyst, said first catalyst having a surface area of about 120 m²/gm to about 400 m²/gm, a pore volume of about 0.7 cc/gm to about 1.5 cc/gm, and an average pore diameter of about 12.5 nm (125 Å) to about 35 nm (350 Å), said molybdenum of said first catalyst being present as the element, as the oxide, as the sulfide, or mixtures thereof to provide an effluent from the first reaction zone; contacting said effluent from said first reaction zone in a second reaction zone under suitable hydrotreating conditions and in the presence of hydrogen with a second catalyst consisting essentially of molybdenum deposited upon a catalytically-active alumina having a pore size that is smaller than that of said first catalyst, said molybdenum of said second catalyst being present in an amount of about 10 wt %, calculated as MoO₃ and based upon the weight of said second catalyst, said molybdenum being present in the elemental form, as the oxide, as the sulfide, or mixtures thereof and said second catalyst having a surface area within the range of about 150 m²/gm to about 300 m²/gm, a majority of its pore volume in pore diameters within the range of about 8 nm (80 Å) to about 13 nm (130 Å), and a pore volume within the range of about 0.4 cc/gm to about 0.9 cc/gm, said second catalyst having less than 40% of its pore volume in pores having diameters within the range of about 5 nm (50 Å) to about 8 nm (80 Å), about 15% to about 65% of its pore volume in pores having diameters within the range of about 8 nm (80 Å) to about 10 nm (100 Å), about 10% to about 50% of its pore volume in pores having diameters within the range of about 10 nm (100 Å) to about 13 nm (130 Å), and less than 15% of its pore volume in pores having diameters that are greater than 13 nm (130 Å), to provide an effluent from said second reaction zone; and contacting said effluent from said second reaction zone under suitable hydrotreating conditions and in the presence of hydrogen in a third reaction zone with a third catalyst comprising about 1.3 wt % cobalt, calculated as CoO and based upon the weight of said third catalyst, about 10 wt % molybdenum, calculated as $MoO_3$ and based upon the weight of said third catalyst, and about 10 wt % chromium, calculated as $Cr_2O_3$ and based upon the weight of said third catalyst, deposed upon a large-pore, catalytically-active alumina, said third catalyst having a pore volume within the range of about 0.4 cc/gm to about 0.8 cc/gm, a surface area within the range of about 150 m²/gm to about 300 m²/gm, and an average pore diameter within the range of about 10 nm (100 Å) to about 20 nm (200 Å) and said third catalyst having about 0% to about 10% of its pore volume in pores having diameters that are smaller than 5 nm (50 Å), about 30% to about 80% of its pore volume in pores having diameters within the range of about 5 nm (50 Å) to about 10 nm (100 Å), about 10% to about 50% of its pore volume in pores having diameters within the range of about 10 nm (100 Å) to about 15 nm (150 Å), and about 0% to about 10% of its pore volume in pores having diameters that are larger than 15 nm (150 Å) to provide a hydrotreated product containing contents of metals, asphaltenes, nitrogen compounds, and sulfur compounds that are lower than those of the corresponding components in said stream.

23. The process according to claim 22, wherein said stream is a member selected from the group consisting of atmospheric petroleum residua, vacuum petroleum residua, tar sands oils, tar sands residua, and liquids obtained from coal.

24. The process according to claim 23, wherein said conditions that are employed in the first reaction zone and the second reaction zone comprise a hydrogen partial pressure within the range of about 6,900 kPa (1,000 psia) to about 20,700 kPa (3,000 psia), an average catalyst bed temperature within the range of about 371° C. (700° F.) to about 454° C. (850° F.), an LHSV within the range of about 0.1 volume of hydrocarbon per hour per volume of catalyst to about 5 volumes of hydrocarbon per hour per volume of catalyst, and a hydrogen recycle rate or hydrogen addition rate within the range of about 356 m³/m³ (2,000 SCFB) to about 2,671 m³/m³ (15,000 SCFB), and wherein said conditions that are employed in the third reaction zone comprise a hydrogen partial pressure within the range of about 6,900 kPa (1,000 psia) to about 20,700 kPa (3,000 psia), an average catalyst bed temperature within the range of about 371° C. (700° F.) to about 438° C. (820° F.), an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 356 m³/m³ (2,000 SCFB) to about 2,671 m³/m³ (15,000 SCFB).

* * * * *

UNITED STATES PATENT OFFICE
CERTIFICATE OF CORRECTION

Patent No. 4,431,525     Dated FEBRUARY 14, 1984

Inventor(s) ALBERT L. HENSLEY, JR., and LEONARD M. QUICK

It is certified that error appears in the above-identified patent and that said Letters Patent are hereby corrected as shown below:

Column 12, line 60, "H2O" should be --$H_2O$--.

Column 13, line 26, "$Cr_2)_7$" should be --$Cr_2O_7$--.

Column 13, line 64, In Table I, for Gravity, °API, under Feed No. 3, insert a dash.

Column 15, line 26, "staninless" should be --stainless--.

Column 16, line 43, "of0.316" should be --of 0.316--.

Signed and Sealed this

Ninth Day of October 1984

[SEAL]

Attest:

GERALD J. MOSSINGHOFF

Attesting Officer     Commissioner of Patents and Trademarks